Dec. 19, 1961   C. YAKEM   3,014,124
STAR LIGHT
Filed Aug. 18, 1959
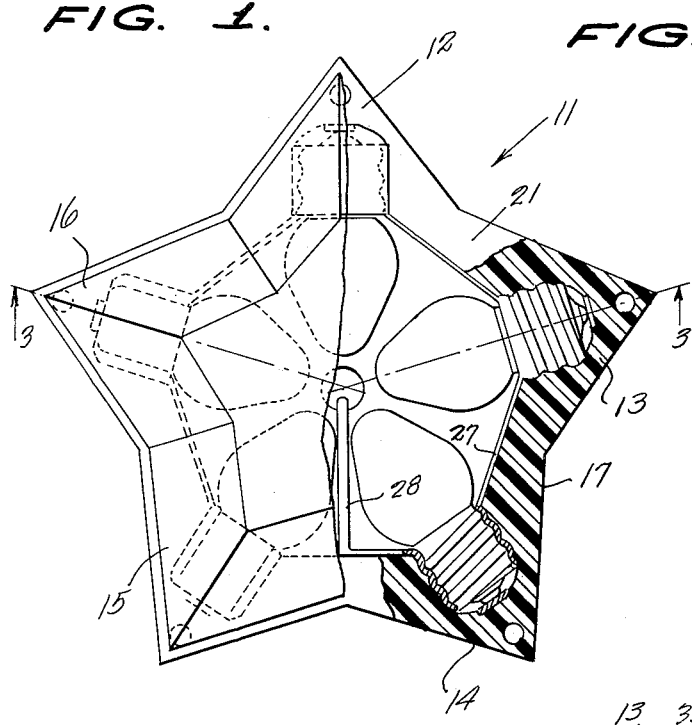
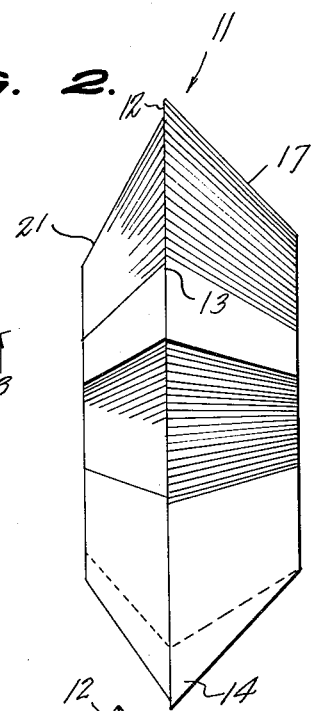
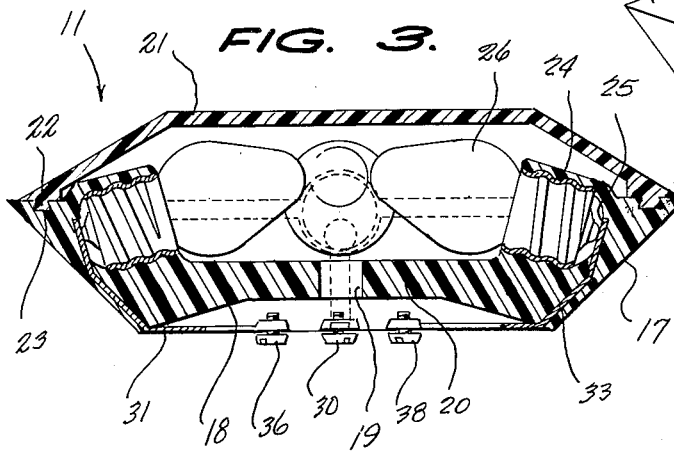
INVENTOR.
CHARLES YAKEM,
BY
McMorrow, Berman & Davidson
ATTORNEYS.

United States Patent Office 3,014,124
Patented Dec. 19, 1961

3,014,124
STAR LIGHT
Charles Yakem, 610 Soles St., McKeesport, Pa.
Filed Aug. 18, 1959, Ser. No. 834,578
3 Claims. (Cl. 240—10)

This invention relates to ornamental lighting devices, and more particularly to an ornamental illuminated device in the form of a star, especially suitable for use on Christmas trees and for similar purposes.

The main object of the invention is to provide a novel and improved ornamental lighting device which is relatively simple in construction, which is highly decorative, and which provides a means of separately controlling the lamps thereof, for example, for sequentially energizing said lamps to provide a novel and attractive effect.

A further object of the invention is to provide an improved ornamental lighting device in the form of a star, the device being provided with a plurality of lamps, which may be of different colors, and being provided with means for separately energizing said lamps, for example, for energizing the lamps in a predetermined sequence, the structure being relatively inexpensive to fabricate, being durable, and providing a highly unusual and ornamental decorative effect.

Further objects and advantages of the invention will become apparent from the following description and claims, and from the accompanying drawings, wherein:

FIGURE 1 is a plan view, partly in horizontal cross section, of an improved ornamental lighting device constructed in accordance with the present invention.

FIGURE 2 is a side elevational view of the ornamental lighting device shown in FIGURE 1.

FIGURE 3 is a transverse vertical cross sectional view, taken substantially on the line 3—3 of FIGURE 1.

FIGURE 4 is a rear view, to a reduced scale, of the ornamental lighting device of FIGURES 1, 2 and 3, showing the electrical terminals thereof.

Referring to the drawings, 11 generally designates an ornamental device according to the present invention, the device comprising a relatively flat hollow body of light transmitting material in the form of a star having the substantially solid respective outer point portions 12, 13, 14, 15 and 16. As shown in FIGURE 3, the body comprises a main section 17 which is centrally recessed or concave at its bottom, as shown at 18, and which is provided with a central aperture 19 in its bottom wall 20. The top covering member, shown at 21, is provided with respective downwardly flaring lugs 22 at its point portions which lockingly engage in corresponding shaped recesses 23 provided in the main body member 17, as shown in FIGURE 3, to detachably secure the cover element 21 in superposed position on the main body member 17. The cover member 21 is preferably centrally upwardly extended, being thus convex outwardly. The main body member 17 is of similar shape, being extended downwardly and being thus convex in a downward direction, except for the concave portion 18 formed in the center of the exterior of its bottom wall.

Mounted in the respective point portions of the main body member 17 are the screw-threaded lamp socket shells 24, the shells being disposed on respective axes which are inclined upwardly and inwardly toward the center axis of the main body member 17, said lamps having axes converging substantially at the same point on the central axis of the member 17. Mounted in the main body 17 outwardly adjacent and axially aligned with the respective threaded shell elements 24 are the respective center contacts 25 adapted to engage with center contacts of respective lamps 26 engaged in the shell members. Thus, differently colored lamps may be mounted in the respective lamp sockets defined by the threaded shell members 24 and center contacts 25. The lamps being thus disposed in positions directed inwardly towards each other, as is clearly illustrated in FIGURE 1.

The shell elements 24 are electrically connected together by integral conductors 27 in the form of strips formed integrally with the shell elements 24 and extending along the inside surfaces of the peripheral walls of main body 17. One of the conductive strips is formed with an inwardly directed terminal strip 28 which extends through the central aperture 19 in the bottom wall of body 17 and is provided at its outer end with a conventional screw terminal 30.

The center contacts 25 are formed integrally with the respective terminal bars 31, 32, 33, 34 and 35 which are relatively rigid and which extend through the peripheral wall of the main body 17, as shown in FIGURE 3. The terminal bars are bent inwardly at their external end portions and are provided at their ends with the respective conventional screw terminals 36, 37, 38, 39 and 40, as shown in FIGURE 4. The terminal bars 31 to 35 are preferably bent at their exterior portions so that the screw terminals extend in the same horizontal plane, and extend in the same plane as the screw terminal 30 on the end of the conducting strip 28 connected to the respective lamp socket shell members. As shown in FIGURE 3, the screw terminals are substantially housed in the bottom recess 18 provided centrally in the bottom wall 20 of the main body 17 of the device.

In using the device, the common screw terminal 30 is connected to one terminal of a suitable source of current, and the remaining terminals 36 to 40 are connected to the other terminal of the power source through a suitable timing switch or similar device arranged to provide sequential connection of the terminals 36 to 40 to the pole of the source of current. This sequentially energizes the respective lamps 26 mounted in the lamp sockets located in the light-transmitting body of the device, the lamp sockets being arranged adjacent the respective point portions of the body, whereby the respective point portions of said body are sequentially illuminated in accordance with the energization of the lamps 26. If the lamps are of different colors, there is thus provided a sequential series of different colored lights which illuminate the body of the device in a predetermined sequence and which thus provides a novel and highly unusual visual effect.

The main body 17 and the cover member 21 may be formed of any suitable light-transmitting material, such as transparent plastic material, or the like, and may be either colorless or may be tinted.

While a specific embodiment of an improved ornamental lighting device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An ornamental lighting device comprising a relatively flat hollow body of light-transmitting material in the form of a star having a plurality of outwardly directed points whose outer portions are solid and having an outwardly convex cover member and a concave bottom surface, inwardly directed lamp sockets mounted in said solid outer point portions, said lamp sockets being disposed on axes which are inclined inwardly toward said cover member and toward the central axis of said body and which converge toward the same point on said central axis, each socket including a shell portion and a center contact, common conductor means in said body conected to said shell portions and extending along the inside peripheral wall surfaces of said body, and terminals extending adjacent said concave bottom surface and connected to said common conductor means and to the center contacts of said sockets.

2. An ornamental lighting device comprising a relatively flat hollow body of light-transmitting material in the form of a star having a plurality of outwardly directed points whose outer portions are solid and having an outwardly convex cover member and a concave bottom surface, inwardly directed lamp sockets mounted in said solid outer point portions, said lamp sockets being disposed on axes which are inclined inwardly toward said cover member and toward the central axis of said body and which converge toward the same point on said central axis, each socket including a shell portion and a center contact, conductors extending along the inside surface of the peripheral walls of the body and interconnecting said shell portions, and terminals extending adjacent said concave bottom surface and connected to one of said conductors and to the center contacts of said sockets.

3. An ornamental lighting device comprising a relatively flat hollow body of light-transmitting material in the form of a star having a plurality of outwardly directed points whose outer portions are solid and having an outwardly convex cover member and a concave bottom surface, inwardly directed lamp sockets mounted in said solid outer point portions, said lamp sockets being disposed on axes which are inclined inwardly toward said cover member and toward the central axis of said body and which converge toward the same point on said central axis, each socket including a shell portion and a center contact, rigid conducting strips extending along the inside surfaces of the peripheral walls of the body and integrally interconnecting all of said shell portions, respective rigid terminal bars extending through the peripheral wall of said body and being integrally connected to the center contacts of said sockets, an additional rigid terminal bar extending through the central portion of the bottom wall of said body and being connected to one of said shell portions, the external portions of said terminal bars being disposed adjacent to said concave bottom surface and in a plane substantially parallel to the bottom wall of said body, and terminals mounted on the ends of said terminal bars.

References Cited in the file of this patent

UNITED STATES PATENTS

| | | |
|---|---|---|
| 1,812,378 | Scandura | June 30, 1931 |
| 1,832,576 | Palmer | Nov. 17, 1931 |
| 2,183,326 | Thaeler | Dec. 12, 1939 |
| 2,535,219 | Margolis et al. | Dec. 26, 1950 |
| 2,696,596 | Eurich | Dec. 7, 1954 |

FOREIGN PATENTS

| | | |
|---|---|---|
| 323,918 | France | Aug. 21, 1902 |
| 2,748 | Switzerland | Apr. 30, 1951 |